United States Patent Office 2,749,710
Patented June 12, 1956

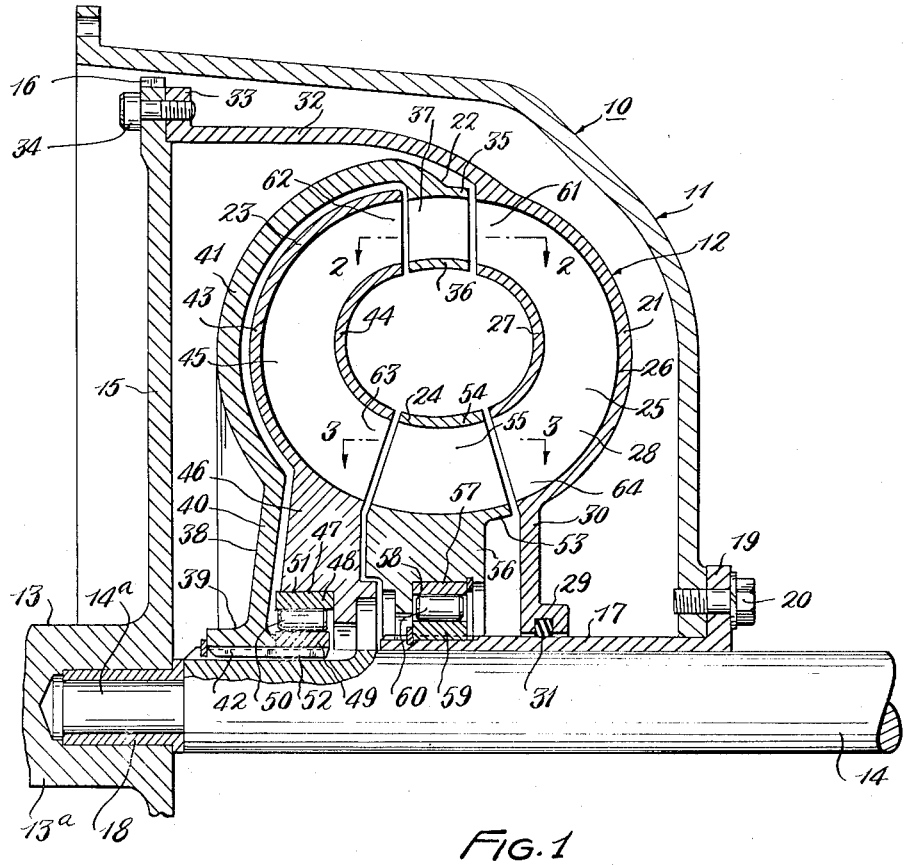

2,749,710

DUAL-TURBINE TORQUE CONVERTER

Robert C. Russell, South Euclid, Ohio, assignor to Eaton Manufacturing Company, Cleveland, Ohio, a corporation of Ohio Application October 12, 1953, Serial No. 385,574

5 Claims. (Cl. 60—54)

This invention relates to power transmission mechanisms, and more particularly, to a hydraulic transmission of the kind having cooperating relatively rotatable bladed annular members defining a toroidal fluid circuit.

An object of this invention is to provide a novel hydraulic transmission of the toroidal fluid circuit type, or so-called torque converter, which is of an extremely simple construction comprising relatively few parts and employing no gearing whatever.

Another object is to provide a novel hydraulic transmission of the kind above-indicated in which the cooperating bladed annular members include a pair of turbine members, one of which has a direct-drive connection with an output means and the other of which is connected with the output means through a one-way clutch means.

A further object is to provide a novel hydraulic transmission of the character mentioned above in which the direct-connected turbine member has an annular bladed portion not exceeding 90 degrees in angular extent arcuately of the toroidal fluid circuit and located at a relatively remote radial lever arm distance from the axis of the output means, and in which the bladed annular portion of the clutch-connected turbine member is of not less than 90 degrees in angular extent and is located between the bladed portions of the direct-connected turbine member and a reaction member inhibited against reverse rotation.

The invention can be further briefly summarized as consisting in certain novel combinations and arrangements of parts hereinafter described and particularly set out in the claims hereof.

In the accompanying sheet of drawing, forming a part of this specification:

Fig. 1 is a partial vertical axial section taken through a transmission mechanism embodying the present invention;

Fig. 2 is a fragmentary sectional view of a somewhat diagrammatic form taken through the first turbine member and adjacent portions of the pump member and second turbine member, substantially as indicated by section line 2—2 of Fig. 1 and illustrating the approximate shape and angularity of the blades of these members; and Fig. 3 is a fragmentary sectional view similar to Fig. 2, but taken through the reaction member and adjacent portions of the pump member and second turbine member, substantially as indicated by section line 3—3 of Fig. 1.

The improved transmission 10 of the accompanying drawing comprises in general a stationary outer housing 11, and a fluid coupling and torque amplifying transmission unit 12 rotatable therein. The transmission 10 also comprises a rotatable power input member or shaft 13 and a rotatable power output member or shaft 14.

The input member 13 comprises a shaft portion 13a, such as a portion of an engine crankshaft, or the like, and a disk or flywheel portion 15 connected with such shaft portion and provided around its outer periphery with gear teeth 16 adapted to be engaged by the driving pinion of a starting motor. The output shaft 14 is rotatably journalled in a fixed inner sleeve 17 and is disposed in substantially coaxial alignment with the shaft portion 13a of the input member. At its forward or inner end, the output shaft 14 is provided with a reduced portion or shaft extension 14a which is journalled in a bushing 18 mounted in an end recess of the input member 13. The inner sleeve 17 extends into the housing 11 substantially centrally thereof and is supported and held in a fixed relation by having its flanged outer end 19 secured to the housing as by means of the screws 20.

The unit 12 comprises a group of relatively rotatable bladed annular members 21, 22, 23 and 24 in cooperating relation for rotation about the axis of the output shaft 14 and defining a toroidal fluid path or circuit passage 25 interiorly of this unit. These bladed annular members 21, 22, 23 and 24 constitute, respectively, a pump member, a first or primary turbine member, a second or secondary turbine member and a reaction member.

The pump member 21 comprises curved annular outer and inner walls 26 and 27 spaced apart by a portion of the fluid circuit passage 25, and an annular group of spaced blades or vanes 28 extending between and connecting such outer and inner walls. This pump member also comprises a substantially central hub portion 29 which is connected with the curved outer wall 26 by a substantially radially extending annular wall or web 30. The hub member 29 is rotatably journalled on the fixed inner sleeve 17 and carries a packing ring 31 interiorly thereof, which extends around and sealingly engages the fixed sleeve. The pump member 21 also includes a substantially axially forwardly extending annular wall 32 which is connected with, or formed as an extension of, the curved outer wall 26 and is provided at its forward end with a radial annular flange 33 which is secured to the disk member 15 as by means of the screws 34.

The first or primary turbine member 22 comprises a pair of curved outer and inner annular walls 35 and 36 spaced apart by a portion of the toroidal fluid circuit passage 25, and an annular group of blades or vanes 37 extending between and connecting such outer and inner walls. This first turbine member also comprises a substantially central hub portion 38 formed by an axial sleeve portion 39 mounted on the output shaft 14, and a substantially radially extending annular wall or web portion 40 carried by such sleeve portion. The first turbine 22 also includes a curved annular wall or web portion 41 extending between and connecting the curved outer wall 35 with the radial wall 40 of the hub portion 38. The first turbine member 22 has a direct-drive connection with the output shaft 14 formed by a keyed or splined engagement of the sleeve portion 39 with the output shaft, as indicated at 42.

The second or secondary turbine member 23 comprises curved outer and inner annular walls 43 and 44 which are spaced apart by a portion of the fluid circuit passage 25, and an annular group of spaced blades or vanes 45 extending between and connecting such outer and inner walls. This second turbine member also includes a substantially radially extending central annular wall portion 46 extending around the output shaft 14 and connected with the curved outer wall 43. The second turbine member is rotatably mounted on the output shaft 14 by means of a one-way clutch device 47.

The clutch device 47 comprises outer and inner clutch rings or races 48 and 49, and an annular group of clutch rollers 50 disposed between such races. The outer race 48 is suitably secured in a central counterbore 51 of the radial wall portion 46 of the second turbine 23. The inner race 49 is mounted on and secured to the output shaft 14 in driving relation thereto by a keyed or splined connection indicated at 52. This one-way clutch device 47 permits a relatively free rotation of the second turbine member 23 in a reverse direction, but forms a driving connection for the transmission of torque to the output shaft 14 from the second turbine when the latter is driven in a forward direction.

The reaction member 24 comprises a pair of curved outer and inner annular walls 53 and 54 which are spaced apart by a portion of the fluid circuit passage 25, and an annular group of spaced blades or vanes 55 extending between and connecting such outer and inner walls. This reaction member also includes a substantially radially extending central annular wall portion 56 which is connected with the curved outer wall 53 and is disposed in surrounding relation to the output shaft 14 and the fixed sleeve 17.

The reaction member 24 is mounted for rotation on the fixed inner sleeve 17 by a one-way clutch device 57 comprising outer and inner clutch rings or races 58 and 59, and an annular group of clutch rollers 60 disposed between such races. The outer clutch race 58 is suitably secured in a central counterbore of the radial wall portion 56 of the reaction member, and the inner clutch race 59 is mounted on and suitably secured to the fixed inner sleeve 17. This one-way clutch device 57 prevents rotation of the reaction member 24 in a reverse direction, but permits a relatively free rotation of the reaction member in a forward direction.

From the construction of the transmission 10 as above-described, it will be seen that the first turbine member 22 is in a direct-connected driving relation to the output shaft 14, and the second turbine member 23 is connected with the output shaft through the one-way clutch device 47. Thus, whenever rotation is imparted to the first turbine member, it will transmit torque to the output shaft 14, and whenever the second turbine member 23 is rotated in a forward direction with a tendency to overrun the output shaft, it will likewise deliver torque to this shaft.

The rotatable annular pump, turbine and reaction members 21, 22, 23 and 24 are disposed in a series relation in the toroidal fluid circuit 25 with the pump member being driven by the input shaft 13, and the first turbine member 22 being located between the discharge portion 61 of the pump member and the inlet portion 62 of the second turbine member 23. The reaction member 24 is located between the discharge portion 63 of the second turbine member 23 and the inlet portion 64 of the pump member 21.

As shown in Fig. 1, the first turbine member 22 and the reaction member 24 are less than 90 degrees of arcuate extent measured along a transverse section of the toroidal fluid circuit 25 and are located, respectively, in the outer and inner axial flow zones of the circuit. The pump member 21 and the second turbine member 23 are shown as being of more than 90 degrees of arcuate extent in such a transverse section and are located, respectively, in the outflow and inflow radial zones of the fluid circuit.

The rotation of the pump member 21 in a forward direction by the input member 13 causes a velocity stream of the hydraulic fluid contained in the unit 12 to be delivered through the discharge portion 61 into the first turbine member 22 from which it passes into and through the second turbine member 23. Upon leaving the second turbine member, the fluid stream passes through the reaction member 24 and returns to the pump member 21 through the inlet portion 64 of the latter.

During the starting or stall condition of operation of the transmission 10, the velocity fluid stream delivered by the pump member 21 will be immediately effective on the first turbine member 22 and will rotate the same such that this turbine member will deliver torque to the output shaft 14 through its direct-drive connection therewith. This stall condition of operation is represented in the diagrammatic view of Fig. 2 from which it will be seen that the impingement of the velocity fluid stream against the blades 37 of the first turbine member 22 will rotate the same in a forward direction as indicated by the arrow 65. The direction of the fluid stream then leaving the first turbine member 22 and impinging against the blades 45 of the inlet portion 62 of the second turbine member 23, will be such as to tend to cause rotation of the second turbine member in a reverse direction. Rotation of the second turbine member at this time in the reverse direction is uninhibited by the one-way clutch device 47. The second turbine member 23 subsequently rotates in the forward direction to deliver torque through the one-way clutch device 47, as is explained hereinafter.

As shown in the diagrammatic view of Fig. 3, the velocity fluid stream leaving the discharge portion 63 of the second turbine member 23 during this starting or stall condition of operation, has a direction of impingement against the blades 55 of the reaction member 24 such as to tend to cause rotation of the reaction member in a reverse direction. Rotation of the reaction member in the reverse direction is prevented, however, by the one-way clutch device 57 and the reaction affect on the first turbine 22 produced by the reaction member will be to amplify the torque output being delivered to the output shaft 14 by the first turbine member.

As the speed of the first turbine member 22 increases, the direction of the fluid stream leaving this turbine member will change and will be such as to impinge against the faces of the blades 45 in a manner to cause the second turbine member to rotate in a forward direction. The speed of the second turbine member will increase and when its speed becomes such as to tend to overrun the output shaft 14, it will deliver torque to the latter through the one-way clutch device 47. As the speed of the first and second turbine members 22 and 23 increase further, they ultimately rotate at approximately the same speed as the pump member 21 at which time both of these turbine members deliver torque to the output shaft 14 and act as runners or fluid coupling members.

When the speed of the second turbine member 23 has increased to approximately the point where this turbine member operates as a runner, the direction of the fluid stream leaving the discharge portion 63 of this turbine member will be such that its impingement against the blades 55 of the reaction member 24 will tend to cause rotation of the reaction member in a forward direction, whereupon the reaction member will rotate idly in the forward direction at substantially the same speed as the pump and turbine members, as is permitted by the one-way clutch device 57.

From the accompanying drawing and the foregoing detailed description, it will now be readily seen that this invention provides a transmission mechanism of the toroidal fluid circuit hydraulic torque converter type which is of an extremely simple and low cost construction employing no gearing of any kind whatever, but which will, nevertheless, deliver a relatively high value of torque to the output shaft during the stall or starting condition of operation and will have only a low value of slip for the cruising speeds of the vehicle employing this transmission mechanism. By providing the two turbine members, one of which is connected in fixed relation to the output shaft and the other through a one-way clutch device, a desired torque amplification is obtainable, with high efficiency, through a wide range of operating speeds.

Although the transmission mechanism of this invention has been illustrated and described herein to a somewhat detailed extent, it will be understood, of course, that

Having thus described my invention, I claim:

1. In a power transmission mechanism; a group of cooperating relatively rotatable bladed annular members defining a toroidal fluid circuit and consisting only of a pump member, first and second turbine members and a reaction member; rotatable power input means connected with said pump member; rotatable output means; said first turbine member being located in said circuit between said pump member and said second turbine member, and said reaction member being located in said circuit between said second turbine member and said pump member; means establishing a direct-drive connection between said first turbine member and said output means; and connecting means connecting said second turbine member with said output means comprising clutch means effective to transmit torque in a forward driving direction to said output means.

2. In a power transmission mechanism; a group of cooperating relatively rotatable bladed annular members defining a toroidal fluid circuit and consisting only of a pump member, first and second turbine members and a reaction member; rotatable power input means connected with said pump member; rotatable output means; said first turbine member being located in said circuit between said pump member and said second turbine member, and said reaction member being located in said circuit between said second turbine member and said pump member; means establishing a direct-drive connection between said first turbine member and said output means; and one-way clutch means effective to transmit torque in a forward driving direction between said second turbine member and said output means and being also effective to permit a relatively free reverse rotation of said second turbine member.

3. In a hydraulic transmission of the toroidal fluid circuit type; a group of cooperating relatively rotatable bladed annular members defining a toroidal fluid circuit and consisting only of a pump member, first and second turbine members and a reaction member inhibited against reverse rotation; rotatable power input means connected with said pump member; rotatable output means; said first turbine member being connected in relatively fixed relation with said output means for rotation therewith and for driving the same; and one-way clutch means effective to transmit torque in a forward driving direction from said second turbine member to said output means and being also effective to permit a relatively free reverse rotation of said second turbine member; said first turbine member and said reaction member being located respectively in the outer and inner axial flow zones of said circuit, and said pump member and said second turbine member being located respectively in the outflow and inflow radial zones of said circuit.

4. In a hydraulic transmission of the toroidal fluid circuit type; a group of cooperating relatively rotatable bladed annular members defining a toroidal fluid circuit and consisting only of a pump member, first and second turbine members and a reaction member; rotatable power input means connected with said pump member; rotatable output means; the bladed portions of said first turbine member and said reaction member being located respectively at relatively far and relatively close radial distances from the axis of said output means; one-way clutch means inhibiting reverse rotation of said reaction member; said first turbine member being connected in relatively fixed direct driving relation to said output means for driving the same; and one-way clutch means effective to transmit torque in a forward driving direction from said second turbine member to said output means and being also effective to permit a relatively free reverse rotation of said second turbine member, said first turbine member and said reaction member being not more than 90 degrees of arcuate extent and located respectively in the outer and inner axial flow zones of said circuit, and said pump member and said second turbine member being not less than 90 degrees of arcuate extent and being located respectively in the outflow and inflow radial zones of said circuit.

5. In a hydraulic transmission of the toroidal fluid circuit type; a group of cooperating relatively rotatable bladed annular members defining a toroidal fluid circuit and consisting only of a pump member, first and second turbine members and a reaction member; rotatable power input means connected with said pump member; rotatable output means; the bladed portions of said first turbine member and said reaction member being located respectively in the outer and inner axial flow zones of said circuit and being less than 90 degrees of arcuate extent along a transverse section of said circuit; one-way clutch means inhibiting reverse rotation of said reaction member; said first turbine member being connected in relatively fixed direct driving relation to said output means for driving the same; and one-way clutch means effective to transmit torque in a forward driving direction from said second turbine member to said output means and being also effective to permit a relatively free reverse rotation of said second turbine member; the bladed portions of said pump member and said second turbine member being located respectively in the outflow and inflow radial zones of said circuit and being of more than 90 degrees of arcuate extent along a transverse section of said circuit.

References Cited in the file of this patent

UNITED STATES PATENTS

| | | |
|---|---|---|
| 1,965,518 | Wilson | July 3, 1934 |
| 2,271,919 | Jandasek | Feb. 3, 1942 |
| 2,616,309 | Russell | Nov. 4, 1952 |